United States Patent
Bernard et al.

(10) Patent No.: US 7,123,210 B2
(45) Date of Patent: Oct. 17, 2006

(54) LOOP-TYPE ANTENNA

(75) Inventors: Tony Bernard, Villeurbanne (FR);
Jean-Marc Martin, Saint Leu la Foret (FR)

(73) Assignee: Pygmalyon, (FR)

( * ) Notice: Subject to any disclaimer, the term of this patent is extended or adjusted under 35 U.S.C. 154(b) by 75 days.

(21) Appl. No.: 10/485,171

(22) PCT Filed: Jul. 30, 2002

(86) PCT No.: PCT/FR02/02747

§ 371 (c)(1),
(2), (4) Date: Jul. 29, 2004

(87) PCT Pub. No.: WO03/012920

PCT Pub. Date: Feb. 13, 2003

(65) Prior Publication Data

US 2004/0257294 A1    Dec. 23, 2004

(30) Foreign Application Priority Data

Jul. 30, 2001   (FR) .................................. 01 10201

(51) Int. Cl.
*H01Q 7/00*        (2006.01)
*H01Q 11/02*       (2006.01)
*G08B 13/14*       (2006.01)

(52) U.S. Cl. .................... 343/866; 343/739; 340/572.1

(58) Field of Classification Search ................ 343/718, 343/726, 728, 732, 739, 741, 743, 744, 748, 343/842, 855, 866; 340/572.1–572.8, 568.1
See application file for complete search history.

(56) References Cited

U.S. PATENT DOCUMENTS 2,400,551 A * 5/1946 Hings .......................... 343/847

(Continued)

FOREIGN PATENT DOCUMENTS

| EP | 0 615 217 | 9/1994 |
|----|-----------|--------|
| EP | 0 897 200 | 2/1999 |

(Continued)

OTHER PUBLICATIONS

International Search Report; PCT/FR02/02747; Dec. 18, 2002.

*Primary Examiner*—Don Wong
*Assistant Examiner*—Marie Antoinette Cabucos
(74) *Attorney, Agent, or Firm*—Cantor Colburn LLP

(57) ABSTRACT

The invention concerns an antenna for use as transmission/reception beacon (2), in a radio frequency identifying system, having a general upturned U configuration, located in a vertical plane, above the ground transversely to a passage (9), the vertical end portions (8b, 8c). The invention is applicable to a system for detecting, over a large width (L), the passage of people, animals or objects bearing electronic tags (7).

10 Claims, 4 Drawing Sheets

U.S. PATENT DOCUMENTS

| | | | |
|---|---|---|---|
| 3,500,373 A * | 3/1970 | Minasy | 340/572.4 |
| 3,838,409 A * | 9/1974 | Minasy et al. | 340/572.7 |
| 3,868,669 A * | 2/1975 | Minasy | 340/572.1 |
| 3,938,044 A * | 2/1976 | Lichtblau | 340/572.3 |
| 3,990,065 A * | 11/1976 | Purinton et al. | 340/572.1 |
| 4,016,553 A * | 4/1977 | Novikoff et al. | 340/572.7 |
| 4,118,693 A * | 10/1978 | Novikoff | 340/572.7 |
| 4,326,198 A * | 4/1982 | Novikoff | 340/572.2 |
| 4,519,066 A * | 5/1985 | Barrett et al. | 370/276 |
| 4,623,877 A * | 11/1986 | Buckens | 340/572.2 |
| 5,121,103 A * | 6/1992 | Minasy et al. | 340/551 |
| 5,945,958 A * | 8/1999 | Staufer et al. | 343/728 |
| 6,172,608 B1 * | 1/2001 | Cole | 340/572.1 |
| 6,359,594 B1 * | 3/2002 | Junod | 343/744 |

FOREIGN PATENT DOCUMENTS

| | | |
|---|---|---|
| FR | 2 785 094 | 4/2000 |
| GB | 2 295 926 | 6/1996 |
| WO | WO 00/22580 | 4/2000 |

* cited by examiner

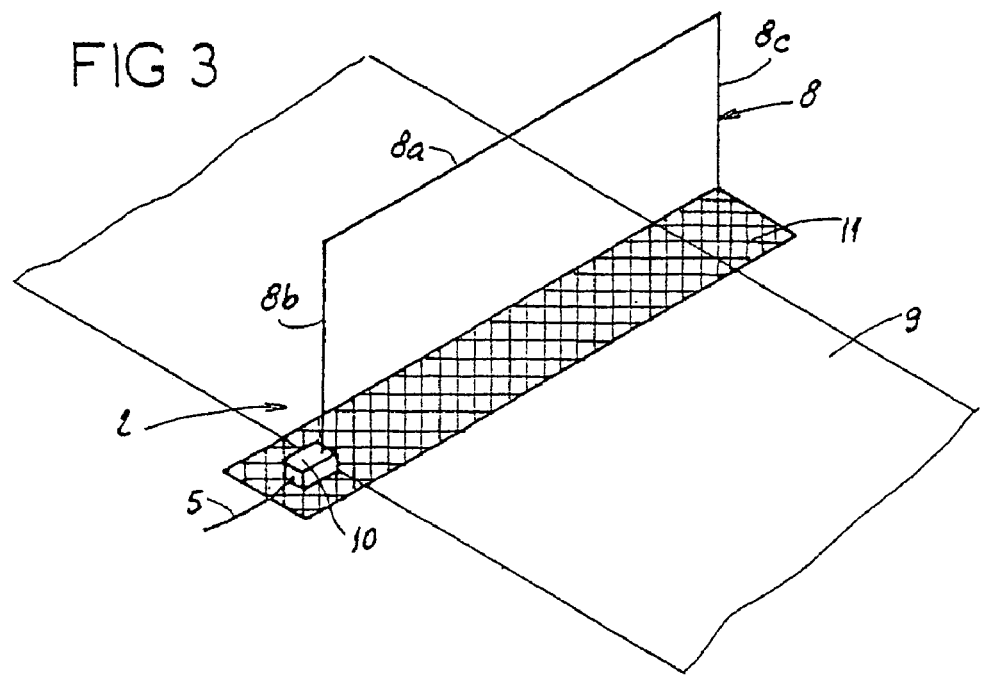
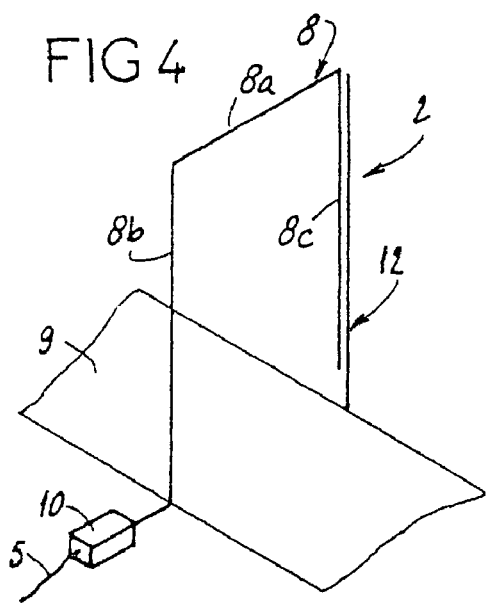
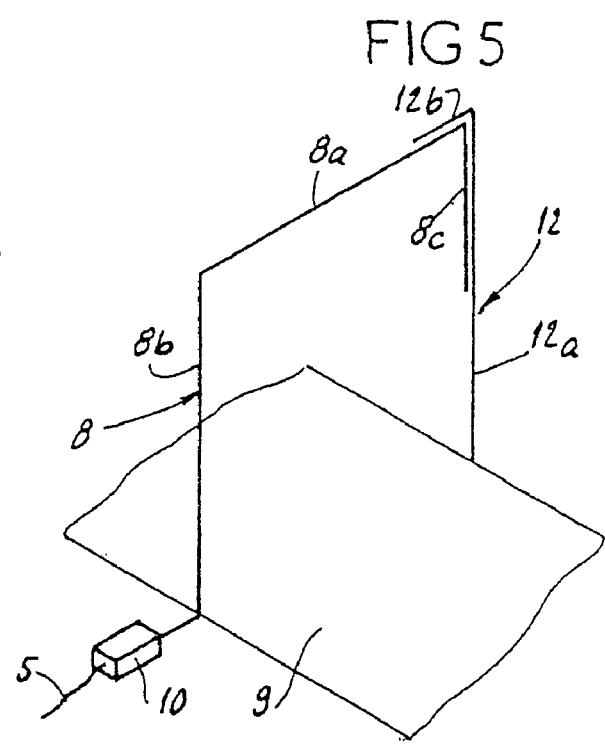

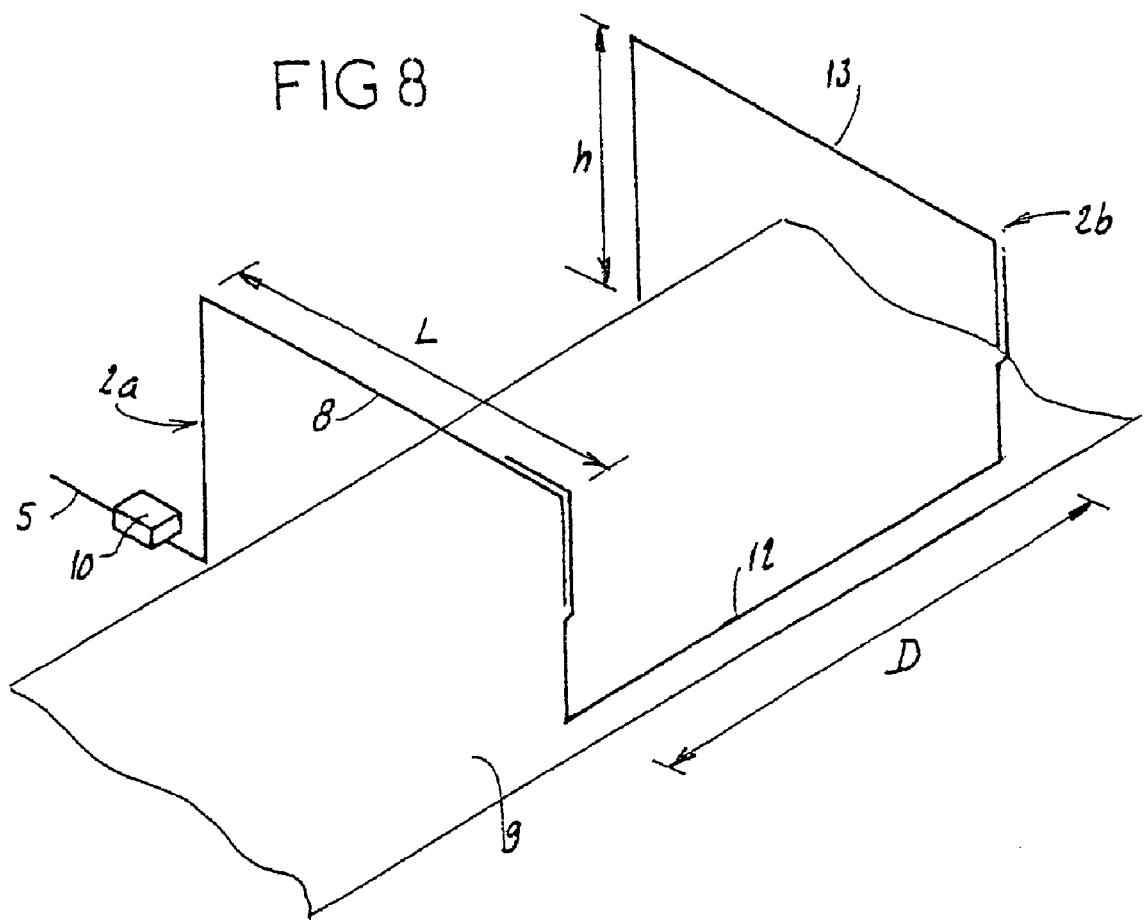
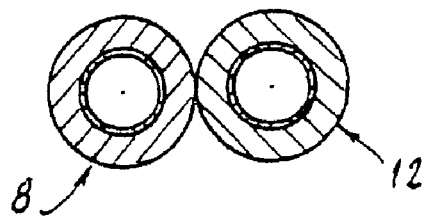

LOOP-TYPE ANTENNA

This application is a 371 of PCT FR02/02747 filed on Jul. 30, 2002

BACKGROUND OF THE INVENTION

The present invention concerns antennas of the "loop" type, used as transmission/reception beacons, particularly in a radio frequency identification system, by means of electronic rags. This invention more particularly applies to antennas which can be used in a system for detecting the passage of persons, animals, or objects of considerable size, each of which bears electronic tags which enable their identification at the moment of detection of said passage. Accordingly, a specific application of the invention is the automatic identification and detection of participants in sports events, especially in order to establish, in an automatic, instantaneous and certain manner, the timing and ranking of the participants in a sports event taking place on a predetermined course involving passage through intermediate points and/or over a predetermined starting line and/or finish line, especially trials in which many competitors are involved and the individual identification thereof by means of the usual, very empirical processes is consequently difficult.

Loop antennas are most often used as receiver antennas in order to capture an electrical and/or magnetic field, in association with a receiver-amplifier of the signal received.

These antennas are also used as transmitter antennas in order to create a magnetic field in certain highly specific applications. Indeed, at a short distance from a current loop, only the magnetic field remains significant, because the electrical field is very weak.

It should be remembered that such a loop antenna, used in order to create a magnetic field, consists of a simple wire which is an electrical conductor, looped around one or more turns, through which runs a current of constant intensity and phase along the entire length of the wire. This antenna may have the configuration of a circular, square, or rectangular loop.

In the case of a rectangular loop antenna, the magnetic field H on an axis perpendicular to the plane of the loop and passing through the center of the loop is given by the following formula:

$$H = n \cdot I \cdot \frac{ab}{p\sqrt{a^2+b^2+h^2}} \cdot \left[\frac{1}{a^2+h^2} + \frac{1}{b^2+h^2}\right] \quad \text{[FORMULA]}$$

wherein:
n is the number of antenna wire loops,
I is the intensity of the current in that wire,
2a is the width of the rectangle formed by the loop,
2b is the length of that rectangle,
h is the difference from the point in question to the center of said rectangle.

When the distance h becomes large relative to a, or a and b, the previous formula is simplified and becomes:

$$H = n \cdot I \cdot \frac{2\,ab}{ph^3} \quad \text{[EQUATION]}$$

or $$H = n \cdot I \cdot \frac{S}{2ph^3} \quad \text{[EQUATION]}$$

wherein S designates the surface area of the loop (equal to 4ab).

We now see that the magnetic field is proportional to the total current n I passing through the loop and to the surface area S of the loop, and that this magnetic field H is inversely proportional to $h^3$ and therefore decreases very quickly when the distance h increases—that is, when one moves away from the plane of the loop, while remaining on the central axis thereof.

It should also be noted that the frequency f of the current running through the loop does not directly intervene in the preceding formulas. In fact, this frequency intervenes due to the fact that the length of the loop wire must be small relative to the wavelength λ. In general, this wavelength is selected so as to be less than λ/4, thus ensuring that the current remains constant.

This type of loop antenna is most frequently implemented by associating the looped wire, of a given length, with an inductance L and a resistance R, to which is associated a capacitance C in such a way as to create a resonant circuit of the RLC type, with $LC\omega^2=1$ (ωbeing equal to 2πf), so that the intensity I of the current within the wire is maximal, because it is only connected to the resistance R of the circuit. This resistance R is itself composed of the resistance of the wire itself, connection resistances, and an additional resistance which enables modulation of the overvoltage coefficient Q=Lω/R, but it then dissipates a non-negligible power R (n I)$^2$.

Another factor which limits the implementation of this type of loop antenna is the actual capacitance of the wire that forms the loop. Indeed, when the length of the wire is increased, its actual capacity becomes considerable, approaching the actual resonance of the wire, which is the acceptable limit for the resonant structure.

In this way, the loop structure of a present-day antenna that transmits a magnetic field is characterized by small dimensions, taking into account the limiting factors set forth above. This structure thus remains rather sensitive to the outside environment because, given that its principal is that of a resonant circuit, numerous types of interference are liable to have an effect on the circuit itself. These include the effect of temperature—for example, as a result of the heating of the additional resistance; the effect of a metallic element placed close to the loop; the effect exerted by components themselves, such as capacitors, which may be the source of high voltages that vary with temperature.

As a result, the applications of present-day loop antennas, in practice, are limited to very local use. In other words, they create a significant magnetic field in a volume whose base does not exceed the surface of the loop and whose height ranges from a few tens of centimeters to a maximum of about 1 m.

The demand for the field of radio frequency identification, mentioned in the introduction to this document—that is, the detection and identification of the bearers of an electronic tag known as a "smart" tag, which responds to a query from a fixed beacon when the bearer passes close to said beacon—is greatest in connection with systems of considerable volume, in which the electronic tags can "dialogue" with the beacon.

In reference to FIG. 1 of the schematic diagram attached hereto, we see how such a radio frequency identification system is configured and operates. The fixed device includes:

- a transmission/reception beacon 2 with a loop antenna 3;
- a reader 4, which is connected by means of a coaxial cable 5 to the beacon 2 and which generates the traffic frequency modulated for the transmission of the command code (the frequency, in this case, being a standardized value of 13.560 MHz),
- a computer 6 which controls the system via software programs for the detection, acquisition and management of the data conveyed to it.

When an electronic tag 7 is located in the reading zone—that is, within a certain volume V indicated by dashed lines—said tag receives electrical power from the electromagnetic energy generated by the transmission/reception beacon 2. The frequency generated by this beacon 2 is modulated in amplitude by the electronic tag 7, according to a code specific to this tag 7. The modulated frequency is received by the reader 4 via the transmission/reception beacon 2.

In the case of a classic loop antenna 3, the beacon 2 is generally located vertically on one end of the volume V, as shown in FIG. 1. As is indicated by the preceding text, the volume V thus controlled by a present-day loop antenna remains quite limited, especially in its width L, but also in its height h and its depth P.

Nonetheless, when the system is applied to the detection of the passage of persons, animals, or objects of considerable size, the dimensions L, h and P may, in practice, have the following values:

- the width L of the passage may be several meters, and even as much as 10 m or more (for example, the entire width of a street);
- the height h is typically 2.5 m;
- the depth P is related to the speed of displacement of the persons, animals, or objects and may reach several meters.

Accordingly, a particularly large volume V is required for the use intended here, and classic loop antennas, such as those used by present-day transmission/reception beacons, cannot meet this need, as was explained above.

BRIEF SUMMARY OF THE INVENTION

The invention provides antennas which are capable of defining large detection volumes, and especially large passage widths, such that said antennas, without disadvantage, can themselves be large in dimension while retaining a simple and inexpensive structure.

The invention comprises a loop antenna comprising at least one electrical conductor wire, generally configured in the shape of an inverted "U" in an essentially vertical plane, located above ground across a passage, so that the antenna forms an open loop.

Such an antenna is constituted, for example, by an electrical conductor wire resulting [sic: presumably "emerging"] for example, from the outer sleeve of a coaxial cable, arranged on a rigid but non-conducting support frame, having the same inverted "U" configuration. The assembly accordingly forms a kind of gate which can span a zone several meters wide, corresponding to the width of the passage of the persons or objects bearing electronic tags to be detected and identified. The height of the passage thus defined can be as much as 2.5 m or more.

According to an especially simple embodiment of the invention, the loop antenna consists of a single wire with a basically horizontal medial portion running above the passage in question and with two basically vertical terminal portions directed toward the ground, one of said terminal portions being free and the other being connected to the reader of a radio frequency identification system. Preferably, this connection, which provides the "input" to the antenna, is implemented by means of an adapter circuit which enables adaptation of the antenna thus formed to the characteristic impedance of the coaxial cable connected to the reader. Advantageously, the adapter circuit consists of an impedance coil and a capacitor, all arranged in a metallic housing, which is itself attached to a grille placed on the ground.

In one variation, the two basically vertical terminal portions of the wire constituting this antenna are connected to a single grille placed on the ground, which runs across the entire width of the passage defined by the antenna.

According to other embodiments of the invention, the antenna consists of a principal wire, which comprises one basically horizontal portion and at least one basically vertical portion connected to the reader of a radio frequency identification system, and at least one secondary wire which comprises one basically vertical portion, opposed to that of the principal wire, such that the secondary wire or one of the secondary wires is intertwined, without electrical contact, with the principal wire along a certain length, in order to form at least one capacitor.

Various wire structures may thus be envisaged, depending upon the configuration of the principal wire and the secondary wire or wires, and depending upon the extent of the area of superimposition of the principal and secondary wires. These structures may be adapted to passages with widths of varying sizes.

Indeed, the principal difficulty facing the operation of a radio frequency detection system, within a large volume, is obtaining within this volume, a continuous and practically constant magnetic field, with no dead areas in the field where the tags would not be detected. It should be noted that, when the length of the antenna wire increases, especially beyond one-quarter of the wavelength, "holes" in the magnetic field may be produced.

However, if a capacitor or a certain capacitance is introduced along the antenna wire, in series with that wire, so that the capacitance is of a determined value and placed in a carefully-selected position, it is possible to obtain a continuous magnetic field, with no dead areas, on the entire surface of the loop formed by the antenna. The function of the capacitance inserted in the antenna is, in this case, to slow down the phase rotation of the current along the antenna wire, and thus to avoid any phase inversion of the current along the wire.

The capacitance values to be introduced here, on the order of a few picofarads to a few tens of picofarads, can be implemented by simply placing two wires side-by-side over a certain length (from a few decimeters to a few meters). The dielectric of the capacitor will then result from the outer insulators of the two juxtaposed wires. This implementation is particularly simple and inexpensive while yielding satisfactory operation, even for large-width loop antennas.

In particular, at the 13.560 MHz frequency used, for antennas with a wire length that exceeds one-quarter wavelength, or approximately 5.6 m (for the frequency used), it is crucial to make use of at least one capacitor, and thus to implement the antenna with one principal wire and at least one secondary wire. For antennas with a wire length that exceeds one-half wavelength, or approximately 11.2 m (for the frequency used), two capacitors may be introduced, by providing one principal wire, a first secondary wire that runs alongside the principal wire for a certain length, at the first end thereof, and a second secondary wire that runs alongside the principal wire for a certain length, at the opposite end thereof In this way, it is possible to use lengths which approach one wavelength, or approximately 22 meters (for the frequency used).

In addition, the introduction of at least one such capacitor into the wire structure of the antenna has the advantageous effect of reducing the sensitivity of the principal wire at its free end. Thus, when a person, an animal, or an object approaches that end of the wire, the effect of interference exerted on the current, and accordingly on the input impedance of the antenna, is greatly diminished. In light of this advantage, the implementation in the form of one principal wire and one secondary wire can also be used for antennas of relatively small dimensions (with a wire length of less than one-quarter wavelength), solely in order to desensitize the end of the principal wire.

Finally, with inserted capacitors that enable the realization of long wire structures, as explained above, it becomes possible to implement three-dimensional antennas, consisting of two or more loops in electrical series, located in essentially parallel vertical planes. The number, position, and value of the inserted capacitors in this case must be determined in such a way as to ensure the most uniform magnetic field possible in the locations through which the persons, animals, or objects to be detected and identified are to pass. In particular, such an antenna can form two loops, one after the other, at a certain predetermined interval, on a passage route, with a view to detecting the direction of progress and/or the speed of the persons, animals, or objects bearing the electronic tags.

BRIEF DESCRIPTION OF THE DRAWINGS

In any event, the invention will be more fully understood by means of the description below, with reference to the schematic diagram appended hereto and representing, by way of example, various embodiments of these loop antennas:

FIG. 3 is a view in perspective of a variation of the antenna in FIG. 2.

FIGS. 4, 5, 6 and 7 represent, in perspective, various antennas according to the invention, with a principal wire and a secondary wire.

FIG. 8 is a view in perspective of another embodiment of this antenna, forming a double loop.

FIG. 9 is a detailed cutaway view of the area of juxtaposition of the principal wire and one secondary wire, in one of the previous antennas.

DETAILED DESCRIPTION OF THE INVENTION

Figure 1:
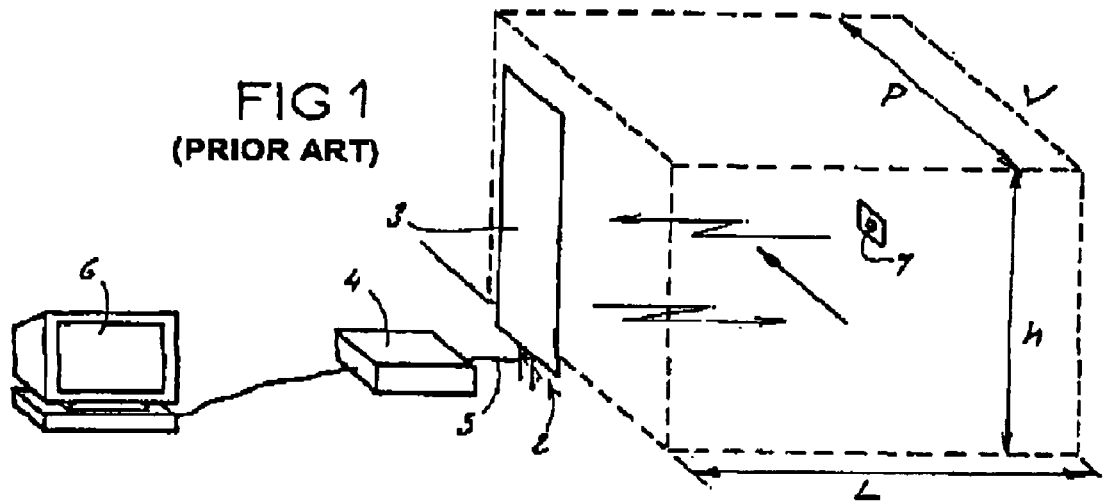
FIG. 1 (mentioned above) shows a loop antenna of the prior art, constituting part of a radio frequency identification system.
Figure 2:
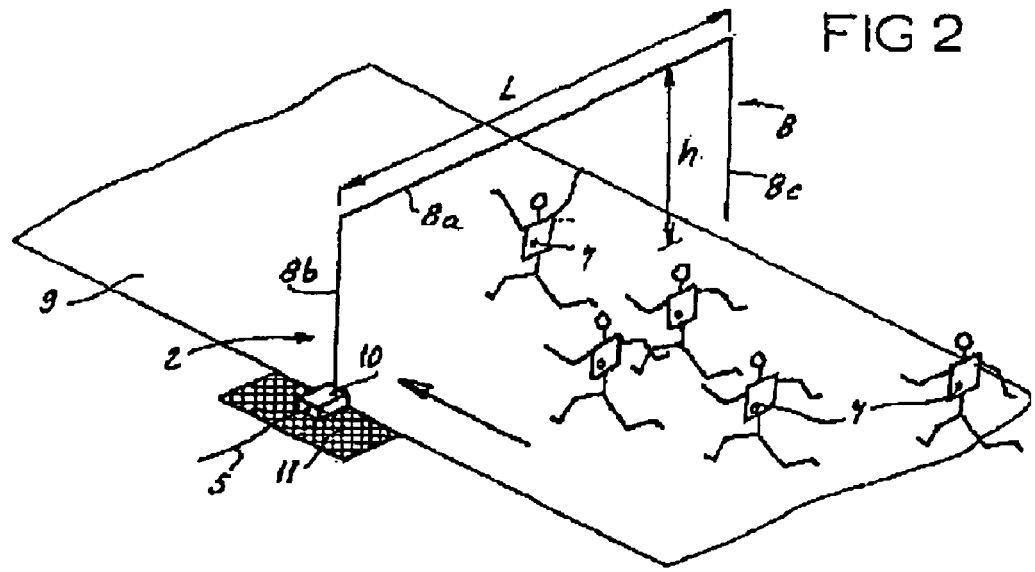
FIG. 2 is a view in perspective of a loop antenna according to the invention, in a simple embodiment.

Referring to FIG. 2, the transmission/reception beacon, generally designated by the reference number 2, includes a loop antenna consisting of a single wire 8 which is an electrical conductor. Located in a vertical plane transversal to a passage route 9, the wire 8 has a horizontal medial portion 8a, which runs above the passage in question, and two vertical terminal portions 8b and 8c, located respectively on both sides of the passage route 9. The wire 8 is kept in this open-loop configuration by a rigid, electrically insulating support frame, of the "gate" type (not individually shown).

The lower end of the first vertical terminal portion 8b of the wire is connected to an adapter circuit, with inductance and a capacitor arranged in a metallic housing 10. This housing 10 is itself attached to a "ground plane" 11, of the trellis or grille type, arranged on the ground, for example, approximately 2 m in length and 0.5 m in width. A coaxial cable 5 connects the housing 10 to the reader (not shown here).

The lower end of the second terminal portion 8c of the wire 8 is, in this embodiment, simply left free.

The antenna thus constituted has a width L of several meters, corresponding to the width of the passage route 9, and a height h which can be on the order of 2.5 m. The beacon 2, provided with this antenna, enables the detection and identification, at the moment of their passage under said beacon, of participants in a sports trial moving along the track 9, each of whom is wearing an electronic tag 7.

In the variation in FIG. 3, the lower end of the second terminal portion 8c of the wire 8 is also attached to a "ground plane" 11, of the trellis or grille type, which, in this case, runs across the entire width of the passage route 9.

In yet another variation (not shown), when the antenna must be installed above a surface area that is covered, for example, with water or snow—that is, when the ground is a poor conductor or is not a solid surface—the trellis or grille is replaced by a return cable which extends from the metallic housing 10, located at the level of the terminal portion 8b, to the vicinity of the other terminal portion 8c. It is also possible to have the terminal portion 8c overlap the free end of the cable, in order to implement a capacitor between the free end of the cable and said terminal portion.

FIG. 4 ff. represent various antennas greater or smaller in width, with a wire structure including one principal wire 8 and one secondary wire 12.

In the case of FIG. 4, the principal wire 8, as in the previous example, has a medial horizontal portion 8a, a first vertical terminal portion 8b connected to an adapter circuit with housing 10, and a second terminal portion 8c which is free. The secondary wire 12, which is a free wire, extends vertically in this case, being intertwined with the second terminal portion 8c of the principal wire 8. In their area of juxtaposition, the two wires 8 and 12 together form a capacitor with a predetermined capacitance.

In the case of FIG. 5, the principal wire 8 has a shortened second terminal portion 8c, whereas the secondary wire 12 has a vertical portion 12a which is extended, at its top end, by a horizontal portion 12b, which runs along part of the medial portion 8a of the principal wire 8. In their area of juxtaposition (which, in this embodiment, is bent), the two wires 8 and 12 again form a capacitor.

Figure 6:
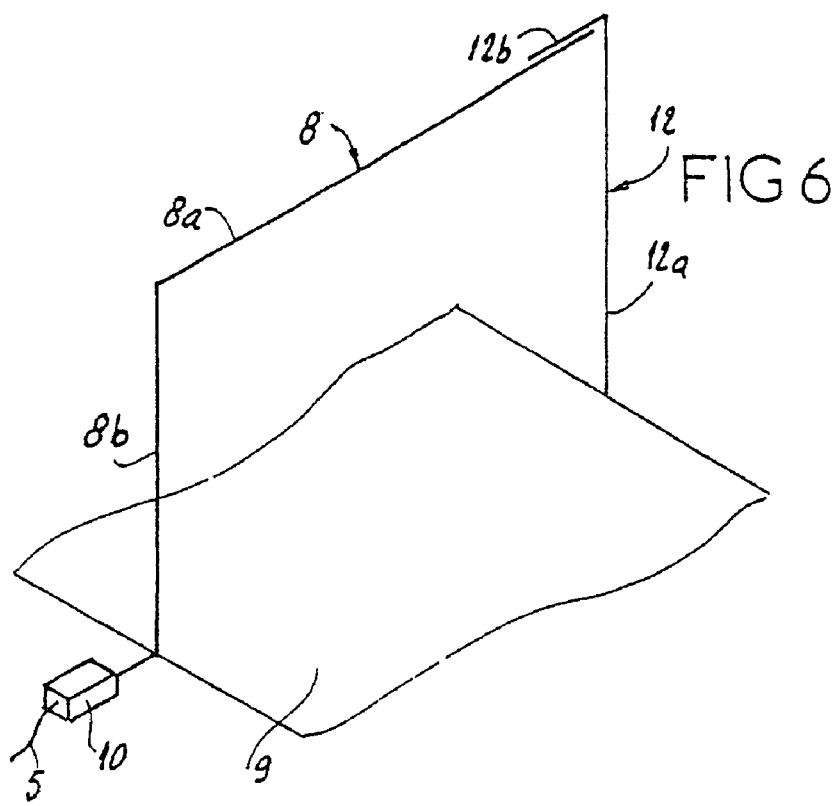

In the case of FIG. 6, the principal wire 8 has a medial horizontal portion 8a, extending across the entire width of the loop, and a single vertical terminal portion 8b, the second vertical terminal portion here being entirely eliminated. The secondary wire 12, as in the previous case, has a vertical portion 12a extended by a horizontal portion 12b, which is superimposed on part of the horizontal portion 8a of the principal wire 8.

Figure 7:
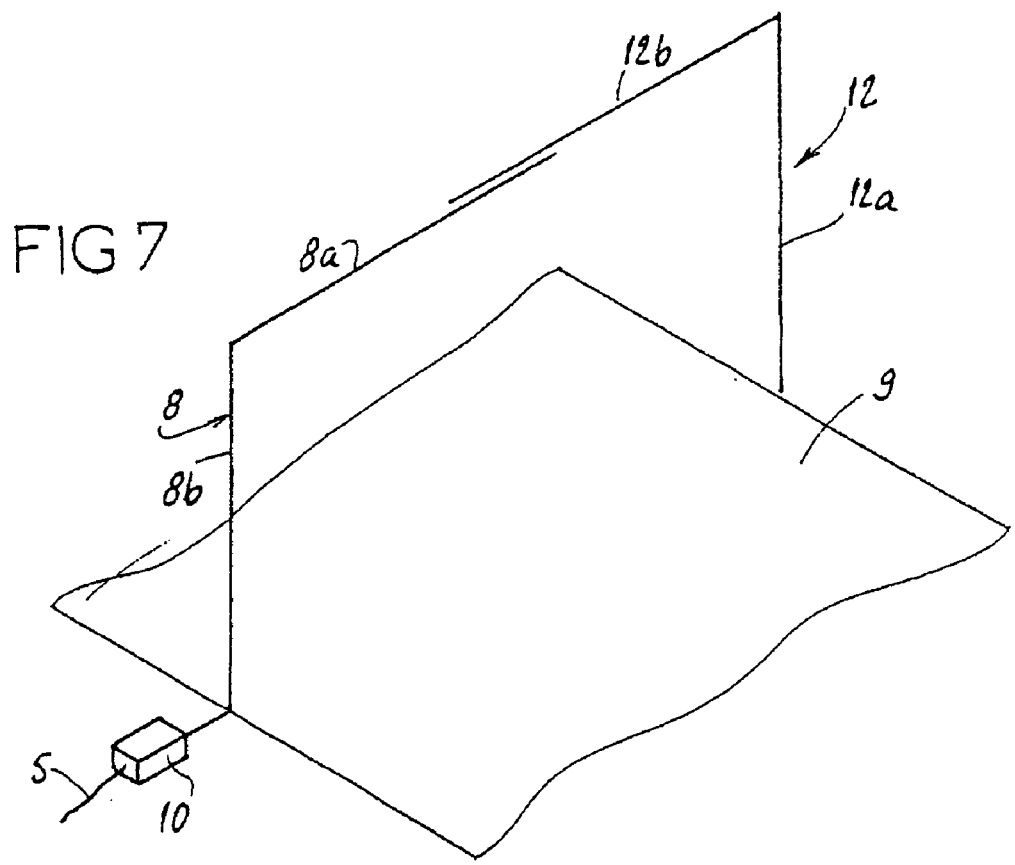

In the case of FIG. 7, the principal wire 8 has a single vertical terminal portion 8b, and its medial horizontal portion 8a ends at roughly the halfway point of the antenna's width. The secondary wire 12 has a vertical portion 12a extended by a horizontal portion 12b which extends to the halfway point of the antenna's width, overlapping a certain length of the horizontal portion 8a of the principal wire 8.

In all of the embodiments of loop antennas in FIGS. 4 to 7, the overlapping area of the principal wire 8 and the secondary wire 12 constitutes a capacitor, as is shown in greater detail in FIG. 9. The respective portions of the two wires 8 and 12, arranged side by side, are in contact by means of their respective protective outer insulators, which are full but preferably flexible, forming the dielectric of the capacitor. In this way, a linear capacitance is obtained on the order of 5 to 7 picofarads for 10 cm. FIG. 8 also shows that the conducting parts of the two wires 8 and 12 are preferably thin conductors, such as metal braids, chosen here for their flexibility.

Thanks to this capacitance inserted into the wire structure, it is possible to prevent, especially for antennas of large width L, any "holes" from occurring in a magnetic field. Similarly, even for smaller-width antennas, such as those shown in FIGS. 3 and 4, this capacitance enables the desensitization of at least the free end of the principal wire 8.

In yet another variation, it is possible, in the antennas represented in FIGS. 4 to 7, to implant the metallic housing 10 in the medial horizontal portion 8a. The ends of the vertical portions are thus left free and can accordingly be located, for example, above water.

As shown in FIG. 8, it is possible to implement antennas with a wire structure that has an even greater total length by combining a principal wire 8, a first secondary wire 12 that runs along the principal wire 8 at its first end, and a second secondary wire 13 that runs along the first secondary wire 12 at its opposite end. More specifically, it is thereby possible to obtain a three-dimensional wire structure, since the antenna is doubled with a first loop 2a and a second loop 2b, located in parallel vertical planes, transversal to the passage route 9 and separated (along the longitudinal direction of said passage route 9) by a certain distance D. The double antenna 2a, 2b thus implemented enables discrimination of the direction of passage of the bearers of electronic tags and/or the determination of their speed by measuring the travel time between the respective planes of the two loops, separated by the known distance D. In variations which are not shown, but which result from the latter embodiment, it is thus possible to have two loops located in planes which are not parallel, but perpendicular to each other, in order to detect electronic tags from all orientations. More generally, the latter type of antenna enables the creation of magnetic fields along all or part of the three principal axes of space.

It is also possible to implement capacitors with variable capacitance in order to adapt the antenna to the environment in which it is implanted.

Naturally, the invention is not limited to the forms of implementation of the loop antennas which are described above, by way of example. On the contrary, it includes all implementation and application variations that follow the same principle. It should especially be noted that modifications of the constructional details of the antennas or implementation thereof in any dimensions, or even the use of the antennas for the detection and identification of all types of bearers of electronic tags, persons, animals, more or less voluminous objects, all fall within the scope of the invention.

The invention claimed is:

1. Loop antenna, used as a transmission/reception beacon in a radio frequency identification system, comprising: a general configuration of an inverted "U" located in an essentially vertical plane, above a ground, transversal to a passage, in such a way as to form an open loop.

2. Loop antenna according to claim 1, wherein said antenna comprises a single wire, with a medial portion essentially horizontal, running above the ground, and with two terminal portions, which are essentially vertical and directed downward, one of them free and the other connected to a reader of a radio frequency identification system.

3. Loop antenna according to claim 2, wherein the vertical portion of the wire is connected to the reader implemented by way of an adapter circuit.

4. Loop antenna according to claim 3, wherein the adapter circuit comprises an impedance coil and a capacitor, all arranged inside a metallic housing, which is attached to a grille placed on the ground.

5. Loop antenna according to claim 4, wherein the two terminal portions of the wire are connected to the grille placed on the ground which runs across the entire width of the ground, said width defined by the antenna.

6. Loop antenna according to claim 3, wherein the adapter circuit comprises an impedance coil and a capacitor, all arranged in a metallic housing which is attached to a return cable which extends up to a vicinity of the free terminal portion.

7. Loop antenna according to claim 6, wherein the return cable overlaps the free terminal portion in order, together with said terminal portion, to comprise a capacitor.

8. Loop antenna according to claim 1, wherein said antenna comprises a principal wire, comprising an essentially horizontal portion and at least one essentially vertical portion connected to a reader of a radio frequency identification system, and at least one secondary wire, which includes a vertical portion opposite that of the principal wire, with the secondary wire being intertwined, without electrical contact, with the principal wire along a certain length, in order to form at least one capacitor.

9. Loop antenna according to claim 8, wherein said antenna is a three-dimensional antenna, comprising two or more loops in electrical series, located in essentially parallel vertical planes.

10. Loop antenna according to claim 1, wherein said antenna is used in a system which detects passage of persons, animals, or objects, each of which bears an electronic tag which enables their identification at a moment of said passage.

* * * * *